US008683282B2

(12) United States Patent
Katz et al.

(10) Patent No.: US 8,683,282 B2
(45) Date of Patent: Mar. 25, 2014

(54) AUTOMATIC IDENTIFICATION OF INFORMATION USEFUL FOR GENERATION-BASED FUNCTIONAL VERIFICATION

(75) Inventors: Yoav Avraham Katz, Haifa (IL); Michal Rimon, Nofit (IL); Elad Yom-Tov, Hamovil (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 13/037,420

(22) Filed: Mar. 1, 2011

(65) Prior Publication Data
US 2012/0226952 A1    Sep. 6, 2012

(51) Int. Cl.
*G01R 31/28* (2006.01)

(52) U.S. Cl.
USPC ........................................... 714/741; 716/106

(58) Field of Classification Search
USPC .................................. 714/741; 716/106, 111
See application file for complete search history.

(56) References Cited

U.S. PATENT DOCUMENTS

| | | | |
|---|---|---|---|
| 6,594,800 B2 * | 7/2003 | Chang et al. ................... | 716/102 |
| 6,678,871 B2 * | 1/2004 | Takeyama et al. .............. | 716/114 |
| 6,708,317 B2 * | 3/2004 | Grisenthwaite ............... | 716/106 |
| 7,311,007 B2 | 12/2007 | Vogler | |
| 7,533,294 B2 | 5/2009 | Mishra et al. | |
| 7,555,688 B2 * | 6/2009 | Alvamani et al. ............. | 714/729 |
| 8,103,987 B2 * | 1/2012 | Banerjee et al. .............. | 716/100 |
| 8,121,827 B2 * | 2/2012 | Azatchi et al. .................. | 703/19 |
| 8,365,133 B2 * | 1/2013 | Chikada ........................ | 716/136 |
| 2007/0055911 A1 | 3/2007 | Boehm et al. | |
| 2008/0255822 A1 | 10/2008 | Adir et al. | |
| 2009/0307468 A1 | 12/2009 | Choudhury et al. | |
| 2010/0042385 A1 * | 2/2010 | Fournier et al. .................... | 703/6 |
| 2010/0057425 A1 | 3/2010 | Gerowitz et al. | |
| 2011/0161897 A1 * | 6/2011 | Maturana et al. ............. | 716/102 |
| 2012/0123763 A1 * | 5/2012 | Jain et al. ........................ | 703/14 |

OTHER PUBLICATIONS

Mishra, P.; Dutt, N., "Functional coverage driven test generation for validation of pipelined processors," Design, Automation and Test in Europe, 2005. Proceedings , vol., No., pp. 678,683 vol. 2, Mar. 7-11, 2005.*

Fine, Shai; Ziv, A., "Coverage directed test generation for functional verification using Bayesian networks," Design Automation Conference, 2003. Proceedings , vol., No., pp. 286,291, Jun. 2-6, 2003.*

Maniatakos, M.; Karimi, N.; Tirumurti, C.; Jas, A.; Makris, Y, "Instruction-Level Impact Analysis of Low-Level Faults in a Modern Microprocessor Controller," Computers, IEEE Transactions on , vol. 60, No. 9, pp. 1260,1273, Sep. 2011.*

(Continued)

*Primary Examiner* — Cynthia Britt
(74) *Attorney, Agent, or Firm* — Ziv Glazberg (57) ABSTRACT

A computer-implemented method, an apparatus and a computer program for automatically extracting useful information for functional verification. The method comprising performing repeatedly both operating an instruction generator associated with a Design Under Test (DUT), whereby a generated instruction is determined, the generated instruction having one or more instruction attributes; and collecting information relating to the generated instruction. Based on the generated instruction and the collected information, a classification technique is utilized to classify the information based on the instruction attributes.

23 Claims, 4 Drawing Sheets

(56) References Cited

OTHER PUBLICATIONS

Serrestou, Y.; Beroulle, V.; Robach, C., "How to Improve a set of design validation data by using mutation-based test," Design and Diagnostics of Electronic Circuits and systems, 2006 IEEE, vol., No., pp. 75,76, Apr. 18-21, 2006.*
S. Fine et al., "Harnessing Machine Learning to Improve the Success Rate of Stimuli Generation", Published in: Journal IEEE Transactions on Computers archive vol. 55 Issue 11, Nov. 2006.
Eric Hennenhoefer and Melanie Typaldos, "The Evolution of Processor Test Generation Technology", Obsidian Software Aug. 2008.
M. Behm et al., "Industrial experience with test generation languages for processor verification", Proceedings of the 41st annual conference on Design automation. DAC 2004, Jun. 7-11, 2004, San Diego, California, USA.
Chandra et al., "AVPGEN—A Test Generator for Architecture Verification", IEEE vol. 3 Issue 2, Jun. 1995.
Prabhat Mishra & Nikil Dutt, "Automatic Functional Test Program Generation for Pipelined Processors using Model Checking", p. 99 & 100, IEEE 2002.
Sreekumar V. Kodakara et al., "Model Based Test Generation for Microprocessor Architecture Validation".
A. Adir et al., "Piparazzi: a test program generator for micro-architecture flow verification", IBM Research Lab in Haifa, Israel, Nov. 12-14, 2003.
Heon-Mo Koo and Prabhat Mishra "Automated Micro-architectural Test Generation for Validation of Modern Processors".
A. Adir et al., "Genesys-Pro: Innovations in Test Program Generation for Functional Processor Verification," IEEE Design and Test of Computers, vol. 21, No. 2, pp. 84-93, 2004.

* cited by examiner

AUTOMATIC IDENTIFICATION OF INFORMATION USEFUL FOR GENERATION-BASED FUNCTIONAL VERIFICATION

BACKGROUND

The present disclosure relates to functional verification in general, and to identification of information useful for generation of tests by a functional verification generator, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

Functional verification of complex processor designs or other component designs is based largely on simulation-based techniques. These techniques generate stimuli in the form of machine-language programs. Faulty behavior of the design is detected by driving the stimuli into a simulator, such as a design simulator, and comparing the actual behavior of the design with the expected behavior implied by the input stimuli.

Architectural tests generators generate test cases for designs. The generator may receive as input a test template, which describes the architectural scenario required by the user, and generates tests that comply with the user scenario. The test template may define the scenarios either partly or fully. In case of partially specified scenarios the test generator randomizes the unspecified aspects of the scenario and biases them toward interesting architectural or micro architectural events.

A test in which the generated instructions access the same resource may be considered as having higher quality, as such test may operate some inter-instruction behavior, such as for example a cache mechanism. Tests may be considered of high quality in case instructions of the same functional unit are operated consecutively and/or concurrently. Tests may be considered of high quality based on additional parameters which are known to a person of ordinary skill in the art.

The scenario may be composed of a sequence of requests on the generated instructions. This may include various parameters such as (1) specifying requests that instructions would be of certain opcodes or types; (2) specifying requests that instructions would have certain operand values; (3) specifying requests that instructions would access (read/write/access) some resources (e.g. request for instructions that read from a specific register); (4) specifying requests that instructions would have some resulting behavior (e.g. take an exception); or the like. When the verification plan is focused on the micro architecture, the scenario may require instructions that have some micro architectural behavior, for example utilize a particular unit, or instructions with long execution time.

Architectural test generators utilize architectural knowledge and micro architectural knowledge of the Design Under Test (DUT), generally referred to in the present disclosure as design knowledge, in order to generate the tests in accordance with the defined scenario. Additionally or alternatively, the design knowledge is utilized to bias the scenario to interesting architectural or micro architectural events. For example, generation may be biased towards providing desired outcomes or side-effects, such as for example, accessing predetermined resource (e.g., register, memory space, and processor unit) or the like.

The term "design knowledge" in the present disclosure may refer to any information that is considered as either "micro architectural knowledge" and/or "architectural knowledge", or similar information.

The architectural knowledge may include, for example, the instruction format and semantics, the registers, exception behavior, translation mechanisms and the like. The micro architectural knowledge may include, for example, a model of the execution time for each instruction, or the conditions for pipeline flushes. While the type of knowledge required is recurring and based on common micro architectural concepts (such as pipelines delays, instruction cracking, and instruction grouping), the details required to implement these requests are highly design specific and can change frequently during the project.

SUMMARY

One exemplary embodiment of the disclosed subject matter is a computer-implemented method, the method performed by a computerized device, the method comprising: performing repeatedly: operating an instruction generator associated with a Design Under Test (DUT), whereby a generated instruction is determined, the generated instruction having one or more instruction attributes; and collecting information relating to the generated instruction; based on the generated instruction and the collected information, utilizing a classification technique to classify the information based on the instruction attributes.

Another exemplary embodiment of the disclosed subject matter is a computerized apparatus having a processor and a storage device, the apparatus comprising: an instruction generator operative to generate an instruction to a Design Under Test (DUT), the generated instruction having one or more instruction attributes; a data collector operative to collect information relating to instructions generated by the instruction generator; a classifier operative to classify the information collected by the data collector based on the instruction attributes.

Yet another exemplary embodiment of the disclosed subject matter is a computer program product, the product comprising: a computer readable medium; a first program instruction for performing repeatedly: operating an instruction generator associated with a Design Under Test (DUT), whereby a generated instruction is determined, the generated instruction having one or more instruction attributes; and collecting information relating to the generated instruction; a second program instruction for utilizing a classification technique to classify the information based on the instruction attributes, wherein the classification is based on the generated instruction and the collected information; wherein the first and second program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to automatically extract information associated with the DUT.

Another technical problem is to automatically extract and determine design knowledge of the DUT, such as architectural knowledge and micro architectural knowledge.

Yet another technical problem is to automatically identify aspects related with the generator. The issues may relate, for example, to performance of the instruction generator in response to specific requests for generation. As another example of aspects related with the generator, the generator may be unable to comply with certain generation requests. Failing to generate requested instructions may be the cause of a bug in the instruction generator or the underlying model being used, such as defined by a DUT definition.

Yet another technical problem is to automatically identify read/write accesses to predetermined resources, such as bits, by instructions, based on a simulation of the operation of the DUT.

One technical solution is to repeatedly generate instructions and simulate execution of the instructions by the DUT. Based on the attributes of the instructions and the simulated operation, classification of the effect of the attributes of the instructions may be determined. In some exemplary embodiments, the classification is decision tree classification which may be reviewed by a human user.

According to yet another technical solution, the simulation may be performed by a design simulator which simulates operation of the DUT using a formal definition of the DUT, such as given using Hardware Descriptive Language (HDL), Verilog, SystemC, or the like. Alternatively or additionally, the simulation may be performed by a reference model which is independent of the formal definition of the DUT but is based on the same specification as the DUT formal definition.

Yet another technical solution is to identify effects of instructions in cases in which the simulator is not operative to detect such effects. For example, in case that read access to a bit is a desired effect to be detected, the disclosed subject matter may simulate the DUT executing the instruction with respect to two initial states of the DUT which differ only in the value of the bit. Based on the difference in output, a determination whether the bit was read may be deduced. The different outputs may be utilized to determine the effect of the value of the bit on writing to a second bit (which may or may not be the same bit).

Yet another technical solution is to utilize machine learning techniques to classify the collected data and deduce rules from it. Decision tree learning may be utilized in order to provide classification which is reviewable by a human user.

Yet another technical solution is to utilize the classified data to determine design knowledge of the DUT. The design knowledge may be defined using a predetermined formal language so as to be useful for a verification tool, such as IBM© Genesys-Pro™.

Yet another technical solution is to collect and classify generation related data, such as performance metrics (e.g., generation time) or generation failures. With respect to performance metrics, the generation time may be compared with a predetermined threshold. In some exemplary embodiments, other performance metrics may be measured, such as CPU time, memory consumption, or the like. With respect to generation failures, specific attributes of requests that cause the generator to fail may be classified and utilized to correct bugs in the DUT definition and/or in the generator.

One technical effect of utilizing the disclosed subject matter is to generate automatically design knowledge specific to the DUT, without requiring user intervention.

Another technical effect is to determine effects of a specific instruction even in case that the simulator does not explicitly indicate the effects (e.g., writing to a bit, reading from a bit or the like).

Yet another technical effect is to enable the verification apparatus to utilize design knowledge of the DUT and therefore be able to bias generated stimuli to cause desired effects, without requiring a user to manually and formally define effects of an instruction. Architectural knowledge of the DUT is design knowledge that can be manually obtained by reviewing a specification of the DUT. Micro architectural knowledge of the DUT is design knowledge that is implementation-specific, such that reviewing the specification may not be sufficient to determine this type of knowledge, but rather the DUT itself should be reviewed. By automatically determining the design knowledge without requiring user intervention, architectural knowledge is determined and utilized without requiring a specification designer to manually intervene. Additionally or alternatively, micro architectural knowledge is determined and utilized without requiring a design engineer to manually intervene.

Yet another technical effect is deduction of design knowledge from a source who is independent of the formal definition of the DUT (e.g., a reference model), and therefore not be affected by bugs caused due to errors in the formal definition Yet another technical effect is that learning the design knowledge and similar information may occur at early stages of the verification process. For example, the disclosed subject matter may be applied as soon as the architectural reference model can execute some instructions. Therefore, even in the absence of a final formal definition of the DUT, verification may commence.

Figure 1:
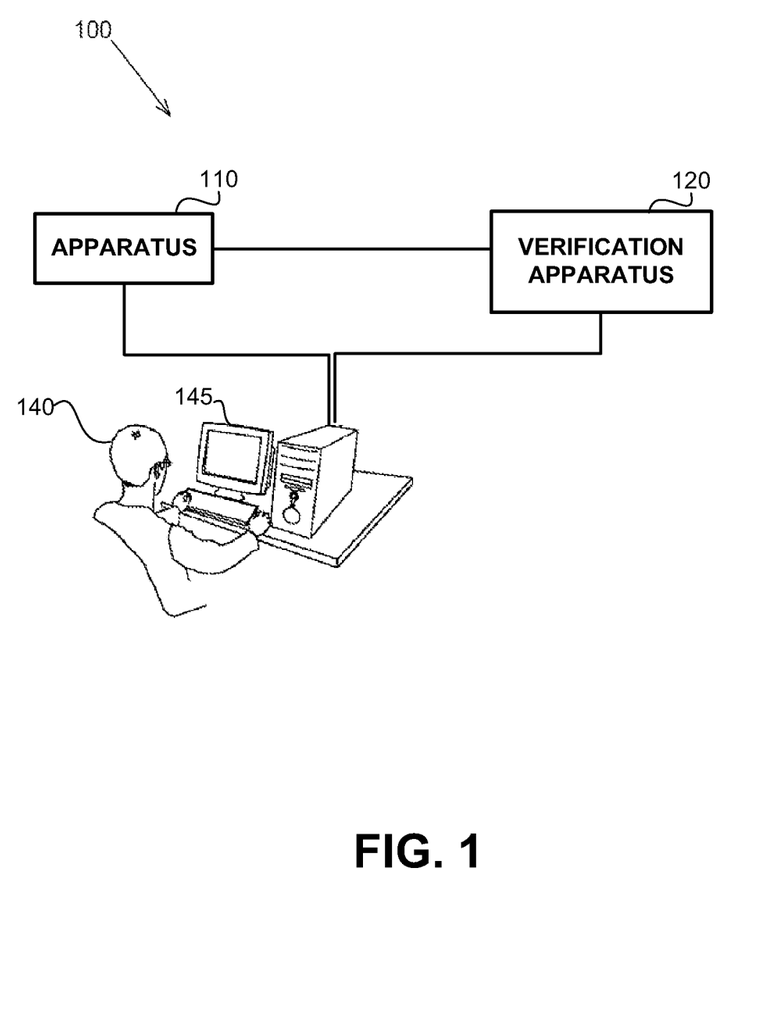
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

A computerized environment 100 may comprise an apparatus 110 operative to collect and learn information regarding the DUT, generator of the DUT, or the like. The apparatus 110 may be operative to utilize machine learning classification techniques to determine the information useful for the verification process. The information may be, for example, performance information regarding generation of instructions based on the given parameters. Alternatively or additionally, the information may be design knowledge of the DUT or similar information useful for generating instructions based on given requests in the test template and/or biasing the generated instruction to cause desired effects. Though the present disclosure focuses on exemplary embodiments associated with extracting architectural knowledge and micro architectural knowledge, it will be noted that the disclosed subject matter is not limited to this type of information.

In some exemplary embodiments, the apparatus 110 may utilize machine learning classification to extract a partial formal model of the architecture behavior of the DUT from a simulator, such as a reference model or a design simulator. The apparatus 110 may be configured to utilize the simulator to simulate operation of the DUT in response to instructions. Based on the attributes of the instructions, the apparatus 110 may classify which combination of attributes and instructions provide specific effects and therefore provide classification useful for defining the design knowledge. In some exemplary embodiments, the apparatus 110 may generate the design knowledge in a predetermined format useful for the verification apparatus 120.

The DUT may be any design of a component which is verified by the verification apparatus 120, such as but not limited to a processor, an Integrated Circuit (IC), a controller, a BUS, cache, another hardware component, or the like. In some exemplary embodiments, the DUT may be implemented in hardware, software, firmware, or the like.

In some exemplary embodiments, a user 140, such as a verification engineer, a designer of the DUT, or the like, may interact with the apparatus 110 using a Man-Machine Interface (MMI) 145 such as a terminal, a display, a keyboard, an input device or the like. The user 140 may review determined design knowledge and optionally modify it. The user 140 may provide rules, commands, preferences, and parameters to the apparatus 110. The user 140 may operate the verification apparatus 120. Alternatively or additionally, the user 140 may monitor operation of the verification apparatus 120 and review its output.

Figure 2:
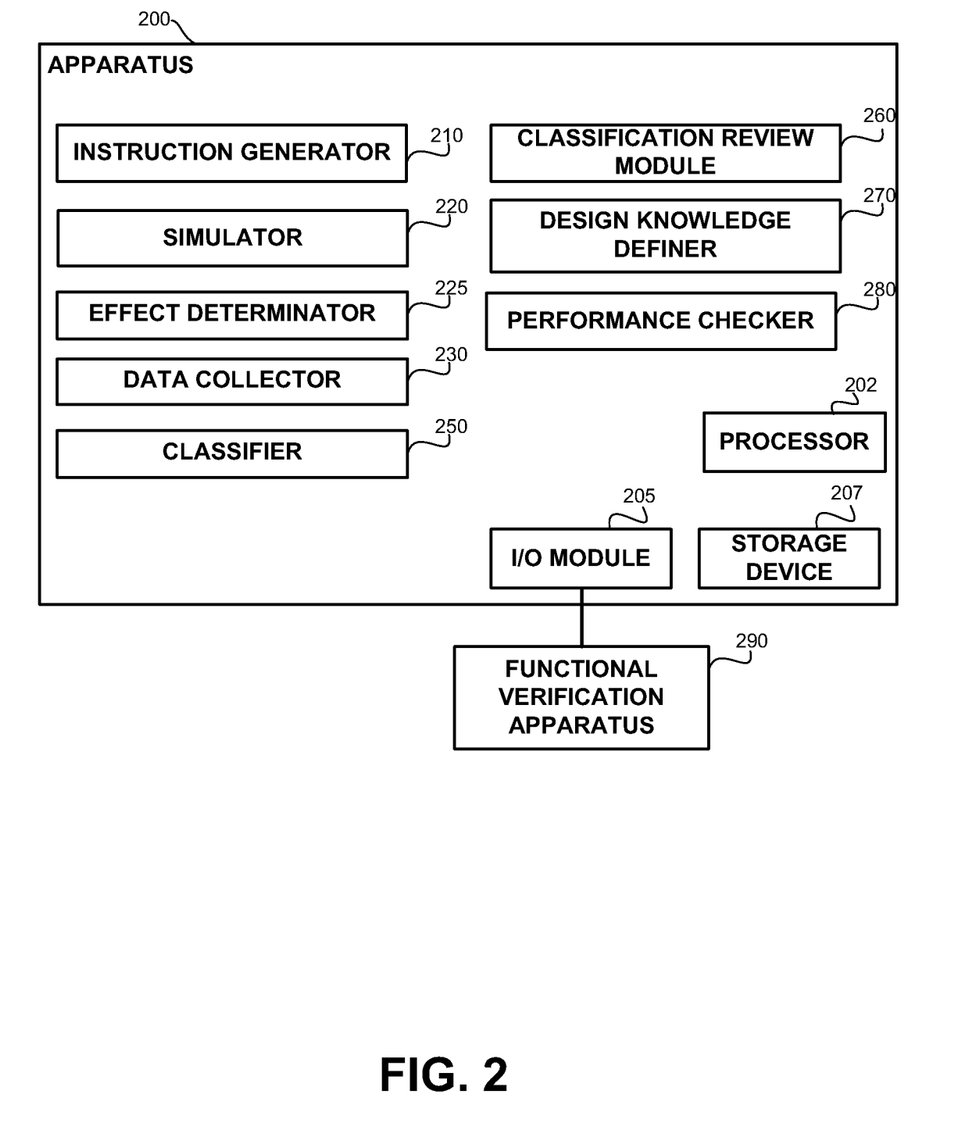
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 110 of FIG. 1, may be configured to automatically determine information associated with the DUT.

In some exemplary embodiments, an instruction generator 210 may be operative to generate instructions for the DUT. The instruction may have one or more attributes determined by the generator, such as, for example, type, opcode, operands, or the like. The instruction generator 210 may be a generator utilized by the verification apparatus 120 of FIG. 1. In some exemplary embodiments, performance of the generator may be measured with respect to the parameters given to the generator 210 defining aspects of the generated instruction.

In some exemplary embodiments, the instruction generator 210 is a Constraint Satisfaction Problem (CSP) solver that is configured to satisfy the one or more CSPs defined by a definition of the DUT. A satisfying solution to the CSPs is utilized to determine the instruction to be generated.

In some exemplary embodiments, a simulator 220 may be operative to simulate operation of the DUT. In some exemplary embodiments, the simulator may be a design simulator, also referred to as an HDL simulator, operative to simulate operation of the DUT based on the formal definition of the DUT. In some exemplary embodiments, the simulator 220 may be a reference model which is not directly based on the formal definition of the DUT. The formal definition of the DUT, also referred to as hardware description of the DUT, may be used in fabricating the target device itself. A reference model may be useful to avoid having the design knowledge be affected by errors in the formal definition of the DUT (which is usually the target of the functional verification process).

In some exemplary embodiments, an effect determinator 225 may be operative to determine an effect of performing an instruction by the DUT. The effect determinator 225 may be operative to simulate performing the instruction with respect to two different values of a resource utilized by the DUT and based on the different outcomes of the instruction, determine how the resource effected the operation of the DUT and/or how the resource was affected by the operation of the DUT. Additional details on operation of the effect determinator 225 are provided hereinbelow.

In some exemplary embodiments, a data collector 230 may be operative to collect information relating to instructions generated by said instruction generator. The data collector 230 may, for example, collect information regarding the instruction attributes and to specific effects of operating the instruction of the instruction attributes, such as based on simulation performed by the simulator 220 or effects determined by the effect determinator 225. Additionally or alternatively, the collected information may comprise information on performance of generating the instruction.

In some exemplary embodiments, a data classifier 250 may be operative to classify the data collected by the data collector 230. The data classifier 250 may utilize machine learning classification techniques, such as a decision tree classifier (e.g. ID3, C4.5, or the like). In some exemplary embodiments, decision tree classifications are considered relatively more prone to human review. A user, such as 140 of FIG. 1, may review the classification and optionally modify it using a classification review module 260. The classification review module 260 may be configured to display the classification and enable a user that is familiar with the design knowledge to verify the correctness of the automatically extracted design knowledge defined by the classification. In some exemplary embodiments, the user may add information to the classification that was not automatically determined by the apparatus 200.

In some exemplary embodiments, a design knowledge definer 270 may be operative to generate design knowledge of the DUT based on the classification determined by the classifier 250 and optionally modified by the user. In some exemplary embodiments, the generated design knowledge (micro architectural knowledge and/or architectural knowledge) may be provided in a predetermined format used by the verification apparatus 120 of FIG. 1.

In some exemplary embodiments, the design knowledge definer 270 may determine behavior rules for the design knowledge based on the decision trees defined by the classifier 250. Each path in a decision tree may represent a conjunction of the splitting conditions in the edges applied to the features in the nodes. This conjunction may be viewed as a sufficient condition for reaching the value (i.e., desired outcome) in the leaf node. A disjunction of all the paths leading to the same value represents all the possible ways to reach this value and therefore it is a necessary and sufficient condition for reaching that value, based on the information available in the decision trees. Note that because the learning is not fully complete and accurate (e.g., a leaf can contain samples with different values), the generated rules only approximate the necessary and sufficient conditions. Because these rules are used in the testing knowledge, this approximation does not affect the validity of the generated tests.

In some exemplary embodiments, a performance checker 280 may be operative to measure performance of the generation by the instruction generator 210. The performance measurement may be compared with a performance threshold. Various performance metrics may be measured and checked such as for example generation time, CPU utilization, CPU time, memory usage, or the like.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the I/O module 205 may be configured to provide the design knowledge (micro architectural knowledge and/or architectural knowledge) to a functional verification apparatus 290. The design knowledge may be provided in various formats, such as by modifying a declarative model used by a generator of the functional verification apparatus 290, such as done in Genesys-Pro™ (which is described in A. Adir et al., "Genesys-Pro: Innovations in Test Program Generation for Functional Processor Verification," IEEE Design and Test of Computers, vol. 21, no. 2, pp. 84-93, 2004. which is hereby incorporated by reference), by creating test template macros to be utilized by the functional verification apparatus 290, such as for example during pre-processing of a test template, creating customized generation program code, or the like.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. The storage device 207 may retain a data collected by the data collector 230, classifications generated by the classifier 250 or modified by the user using the classification review module 260, and a formal definition of the design knowledge generated by the design knowledge definer 270.

Figure 3A:
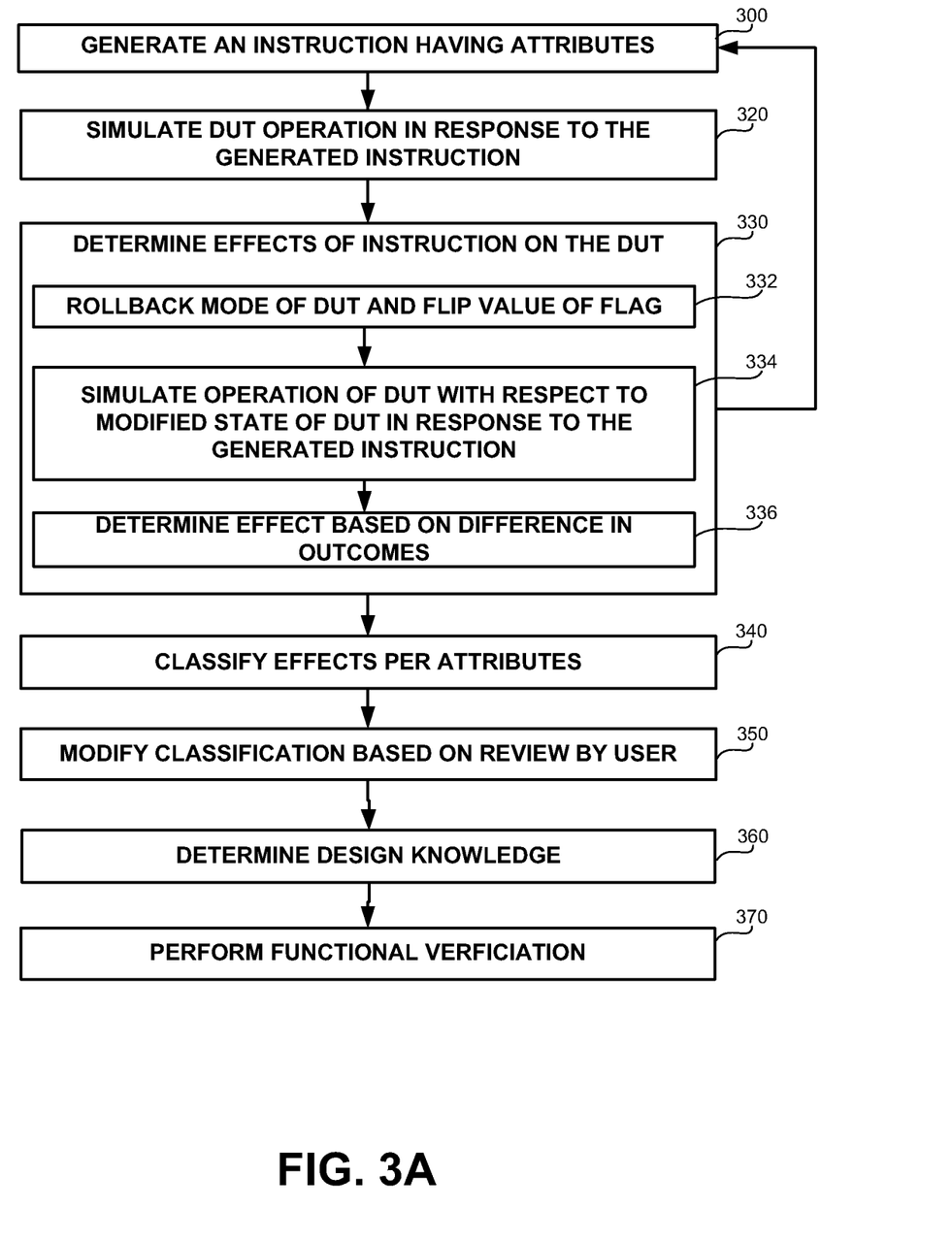
FIGS. 3A and 3B show a flowchart diagram of a method, in accordance with some exemplary embodiments of the disclosed subject matter.

Referring now to FIG. 3A showing a flowchart diagram of a method in accordance with some exemplary embodiments of the disclosed subject matter.

In step 300, an instruction to the DUT may be generated. The generated instruction may have instruction attributes. The instruction may be generated by an instruction generator 210.

In step 320, DUT operation in response to the generated instruction may be simulated. The simulation may be performed by a simulator, such as 220 of FIG. 2.

In step 330, effects of the instruction on the DUT may be determined. The determination may be performed by receiving explicit data from the simulator 220 (e.g., resource X was read, resource Y was written into, or the like). Alternatively, if effect of the instruction with respect to a resource is desired and in absence of an explicit data regarding such effect, the effect may be deduced implicitly, such as by performing steps 332-336. Steps 332-336 may be performed by an effect determinator 225.

In step 332, the state of the simulated DUT is rolled back to the state prior to simulation step 320. The state may be modified with respect to a target resource, such as by flipping a bit flag in a register.

In step 334, the DUT operation with respect to the modified state and in response to the same instruction may be simulated in a similar manner performed in step 320.

In step 336, based on the different outcome of the simulation step in step 320 and in step 334, the effect is determined. The effect may be, for example, the value of the bit (or other resource) is read by the instruction. Additionally or alternatively, the effect may be that the instruction writes into the bit. In some exemplary embodiments, in case that the resource is not a single bit and thus may have possible states, steps 332 and 334 may be performed a plurality of times, such as to cover additional possible states and not just two possible states. It will be noted that in some cases only a portion of the possible states of the resource may be checked.

Steps 300-330 may be performed iteratively and repeatedly until sufficient information is collected. Sufficiency may be based on a threshold of amount of data.

In step 340, the effects are classified per the instruction and attributes. The classification may be performed by a classifier 250.

In some exemplary embodiments, classification may be performed iteratively and sufficiency of data may be determined based on statistical confidence in the classification.

In step 350, and in case the classification is reviewable by a human user, the classification may be presented to a user who may review the classification and verify correctness of the deduced design knowledge. Additionally or alternatively, the user may modify the classification. The review may be enabled by a classification review module 260.

In step 360, design knowledge of the DUT may be generated based on the classification. The design knowledge may be generated in a predetermined format. The design knowledge may be generated by a design knowledge definer 270.

In step 370, functional verification of the DUT may be performed using the design knowledge. Functional verification may be performed by a verification apparatus 120. Functional verification may be performed by generating stimuli to the DUT based on a test template, wherein the generated stimuli is biased to cause desired effects such as defined by the test template or inherently desired by the simulator. The desired effects may be effects that deem the stimuli to be considered as of relatively high quality. The generation may be based on the design knowledge.

Figure 3B:
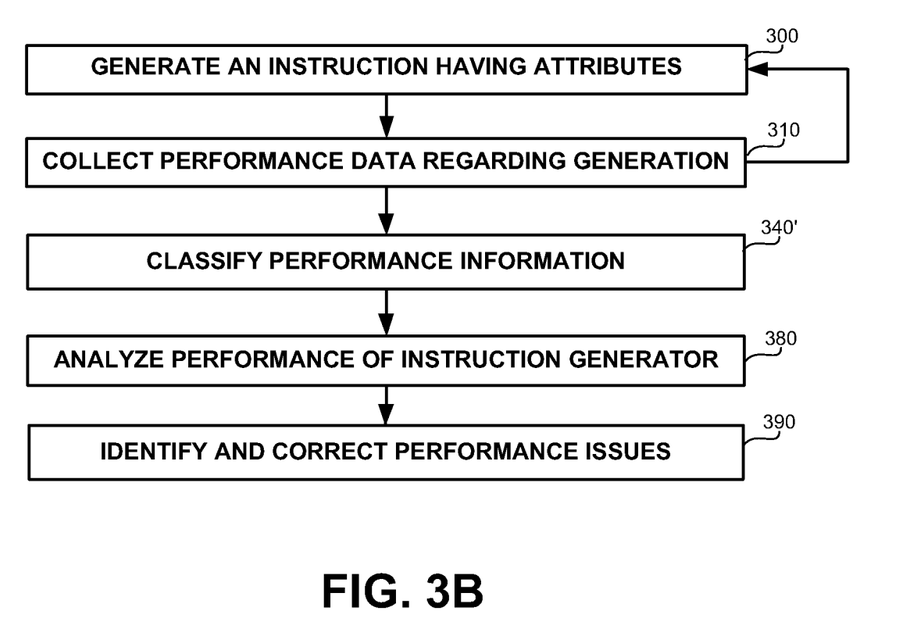

Referring now to FIG. 3B showing a flowchart diagram of a method in accordance with some exemplary embodiments of the disclosed subject matter.

In step 310, performance data associated with generation of the instruction in step 300 is collected.

In step 340', classification of the performance data is performed. The classification may classify parameters to the instruction generator that cause performance issues, such as performance below a threshold.

In step 380, the performance of the instruction generator may be analyzed. The analysis is based on the classification of step 340'.

In step 390, a user, such as a developer of the instruction generator, may identify and resolve performance issues of the instruction generator.

Additionally or alternatively, in some exemplary embodiments, generation success or failure data may be collected and classified in a similar manner. Thereby, providing classification of parameters to the instruction generator that cause the generation process to fail. In some exemplary embodiments, a generator may utilize an underlying DUT definition and tries to satisfy generation requests based on the definition. In case that the definition provides contradicting constraints, the generation may fail. Therefore, identifying parameters which cause the generator to fail may be useful for identifying errors in the DUT definition, and therefore useful for the verification process.

Figure 4:
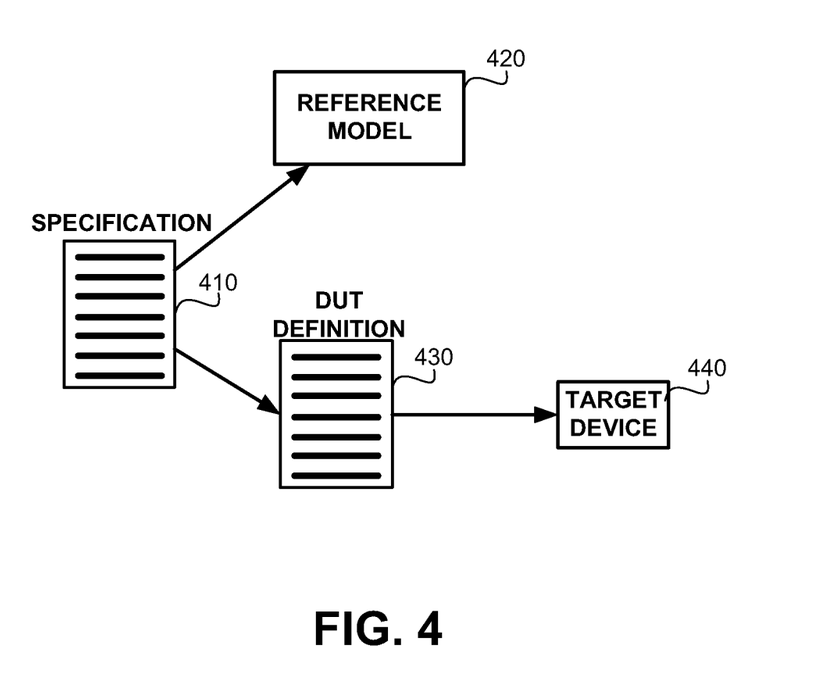
FIG. 4 shows a diagram of products associated with a Design Under Test, in accordance with some exemplary embodiments of the disclosed subject matter.

Referring now to FIG. 4 showing a diagram of products associated with a Design Under Test, in accordance with some exemplary embodiments of the disclosed subject matter.

A specification 410 may define the behavior of the target device. The specification 410 may be provided in a formal or an informal definition. The specification may be an output of a specification process and an input to a design process in which an engineer designs the target device.

The engineer may define a Design definition, also referred to as a DUT definition 430. The DUT definition 430 may be provided in a formal definition such as using HDL, Verilog, SystemC, or the like.

Based on the DUT definition 430, the target device 440 may be fabricated.

A reference model 420 may be a simulator simulating operation of the target device 440. The reference model 420 is not based on the DUT definition 430. The reference model 420 may simulate operation of the target device 410 based on the definition by the specification 410. The reference model 420 may be defined by a programming language such as C++, C#, Java, or the like, or may be alternatively defined using hardware definition such as given by HDL, Verilog, SystemC, or the like. As opposed to the DUT definition 430 which is used in fabrication of the target device 440, the reference model 420 is not used in fabrication and therefore may require to be as efficiently implemented. Therefore, different implementation of the specification 410 may be used to compare outputs and identify bugs in the DUT 430. In some exemplary embodiments, the reference model 420 may be implemented before the DUT 430 is implemented and therefore the disclosed subject matter may be utilized at an earlier stage. Additionally or alternatively, the reference model 420 is independent of the DUT 430 and therefore extracting design knowledge of the reference model 420 is not affected by bugs in the DUT 430.

In some exemplary embodiments, the reference model 420 may be implemented to provide an output regarding effects of instructions. Alternatively, in some cases, the reference model 420 may not provide such an explicit output, and an effect determinator 225 may be utilized to determine such effects.

In some exemplary embodiments, the scheme of a method in accordance with the disclosed subject matter may be:

Repeatedly:
1. Generate an instruction
2. Collect information about input features of the instruction, e.g. instruction type, operands, register values
3. Execute the instruction on the reference model
4. Collect information about output architectural properties of the instruction.
   (e.g. resource written, exception occurred, etc. . . . )

After a sufficient set of samples is collected a decision tree classifier may be utilized deduce the rules that predict under which input feature values do the relevant output architectural properties hold. The result of the classification stage is a set of rules and the probabilities that applying each rule would yield the desired output property value.

The rules are converted to a form that can be used by the generator. An exemplary scheme is that given the collection of rules and a requested probability by the user, all rules that satisfy the desired probability of causing the requested behavior are selected. The selected rules are integrated into the instruction generation scheme such that the generated instruction is guaranteed to meet the restriction expressed by the rule.

In some exemplary embodiments, a test comprising a plurality of instructions is generated. Operation of the DUT is simulated in response to the test. Information regarding the simulation is collected (e.g. traces of the simulation activity). Based on the collected information, properties of the instruction behavior (e.g. execution time) may be collected. The generation input and the results viewed in the simulation may be matched and sent to the classifier to create rules.

In some cases, the effects of the instruction may not be provided expressly and the following embodiment may be used. Additionally or alternatively, in order to provide a small amount of samples that are sufficient in order to deduce design knowledge the following embodiment may be used.

As an example, identifying if a particular flag in a condition register affects an instruction's behavior cannot be easily deduced by comparing different samples because it is unlikely they will be similar in all the other input features.

In some exemplary embodiments, the scheme of a method in accordance with the disclosed subject matter may be modified by performing instead of the above mentioned steps 1-3 performing:
1. Generate an instruction
2. Collect information about the instruction attributes, e.g. instruction type, operands, register values
3. Store the value of the flag
4. Execute the instruction by a simulator (e.g., reference model)
5. Review simulated machine state (e.g., all registers and memory values) to determine if the value of flag has changed
6. Store the simulated machine state
7. Rollback the simulated machine state to the one before executing the instruction
8. Negate the value of the flag
9. Reexecute the instruction by the simulator
10. Review simulated machine state to determine if the value of flag has changed
11. Compare the stored simulated machine state and the current simulated machine state:
    (a) Determine that the value of the flag was read by the instruction and affected its operation by checking if the simulated states are different (beside from the value of the flag). In addition, if only in one of the simulated executions the value of the flag has changed, then the value of the flag may be deemed as read by the instruction and affected its operation.
    (b) Determine that the instruction writes to the flag if the value of the
    flag has changed in either of the simulated executions.

The example below is provided to show a case where conditions that cause a 'bc' (branch conditional) instruction to be affected by the CR register (Condition register) are determined. Such architecture knowledge can be use to generate interesting events (such as instructions that write to the CR, followed by branches that are affected by the CR register).

The following are several examples of the samples collected. For each sample, the instruction name, register values before the instruction was executed, the instruction operands, and whether the instruction was affected by the CR.
opcode,CTR,MSR.US,MSR.VMX,MSR.VSX,bi.data,
bi.data==bo.data,
bi.data==branchBdRelative.bdDisplacementRef.data,bo.
data,bo.data==branchBdRelative.bdDisplacementRef.data,
branchBdRelative.bdDisplacementRef.data|CR.Affected
bc,147DB9BE3C4F54AE, ,0x1,0x0,0x7,False,False,0x1B, False,0xBAC4|False
bc,none, ,0x1,0x0,0x13,False,False,0xC,False,0x5E84|True
bc,none, 0x0,0x1,0x0,0x1E,False,False,0x1C,False, 0x8DFC|False
bc,77B3EB82A79393A1, 0x1,0x0,0x5,False,False,0x1A, False,0xD30|False The following is an example output of the classifier. Note that out of the many input properties, only three were identified as those that determine if the branch instruction is affected by CR. These are the bo.data and bi.data operand fields and the content of the CTR (in special cases).
<!--(opcode in {bc}) & (bo.data in {0x0,0x1,0x8,0x9}) & (CTR in {!0000000000000001})-->
<!--always (100%)-->
<!--209 out of 209 attempts-->
<!--(opcode in {bc}) & (bo.data in {0x4,0x5,0x6,0x7,0xC, 0xD,0xE,0xF})-->
<!--always (100%)-->
<!--952 out of 952 attempts-->
<!--(opcode in {bc})-->
<!--sometimes (47%)-->
<!--1193 out of 2486 attempts-->

Hence the design knowledge (here—architectural knowledge) of the be instruction is determined automatically without requiring a user to provide input from his own personal knowledge of the architecture of the DUT.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method performed by a computerized device, the method comprising:
   performing repeatedly: operating an instruction generator associated with a Design Under Test (DUT), whereby a generated instruction is determined, the generated instruction having one or more instruction attributes;
   collecting information relating to the generated instruction;
   based on the generated instruction and the collected information, utilizing a classification technique to classify the information based on the instruction attributes;
   determining design knowledge associated with the DUT based on the classified information; and
   performing functional verification using the instruction generator utilizing the design knowledge associated with the DUT, wherein the instruction generator is operative to utilize the design knowledge in generating tests.

2. The computer-implemented method of claim 1, wherein said performing repeatedly further comprising simulating execution of generated instruction by the DUT; and wherein the collected information is information regarding affects of the DUT performing the generated instruction.

3. The computer-implemented method of claim 2, further comprising, responsive to a review by a user of the classified information, modifying the classified information.

4. The computer-implemented method of claim 3, wherein the classification technique is a decision tree learning.

5. The computer-implemented method of claim 2, wherein said simulating is performed using a simulator configured to simulate operation of the DUT based on a hardware description of the DUT, wherein the hardware description is useful for fabrication of a target device defined by the DUT.

6. The computer-implemented method of claim 2, wherein said simulating is performed using a reference model of the DUT.

7. The computer-implemented method of claim 2, wherein said collect information comprises:
   simulating execution of the generated instruction by the DUT from a first initial state to obtain a first state of the DUT;
   simulating execution of the generated instruction by the DUT from a second initial state to obtain a second state of the DUT, wherein the first and second initial states differ with respect to one or more resources of the DUT; and
   based on a determined difference between the first state and the second state, determining an effect of the one or more resources on the generated instruction.

8. The computer-implemented method of claim 7, wherein the one or more resources is a bit of a register, wherein the first initial state and the second initial state differ only in the value of the bit, and wherein the effect of the bit on the generated instruction is determined.

9. The computer-implemented method of claim 8, further comprising determining whether the generated instruction is operative to read value of the bit and whether the generated instruction is operative to write value to the bit.

10. The computer-implemented method of claim 1, wherein the design knowledge comprises at least one of the following: information useful for biasing the generated instruction to cause a desired outcome; and information regarding possible attributes of the generated instruction.

11. The computer-implemented method of claim 1, wherein the information is performance information of the instruction generator; and the method further comprising indicating to a user instruction attributes for which performance of the instruction generator is below a performance threshold.

12. The computer-implemented method of claim 1, wherein said operating the instruction generator comprises providing the instruction generator with randomly selected generation requirements;
   wherein the information is generation failure information; and
   the method further comprises indicating to a user a classification of generation requirements that cause generation failure.

13. The computer-implemented method of claim 1, wherein the one or more resources is a memory space or a processor unit.

14. A computerized apparatus having a processor and a storage device, the apparatus comprising:
- an instruction generator operative to generate an instruction to a Design Under Test (DUT), the generated instruction having one or more instruction attributes;
- a data collector operative to collect information relating to instructions generated by said instruction generator;
- a classifier operative to classify the information collected by said data collector based on the instruction attributes;
- a design knowledge definer operative to determine a design knowledge of the DUT based on classification by said classifier; and
- an interface to a functional verification apparatus, wherein said functional verification apparatus is operative to utilize the design knowledge in generation of tests.

15. The computerized apparatus of claim 14 further comprises a simulator operative to simulate operation of the DUT, wherein said data collector is operative to collect data relating to operation of the DUT in response to the instructions, as simulated by said simulator.

16. The computerized apparatus of claim 15, wherein said simulator is selected from the group consisting of: a design simulator operative to simulate operation of the DUT based on a hardware description of the DUT, wherein the hardware description is useful for fabrication of a target device based on the DUT, and a reference model.

17. The computerized apparatus of claim 15, wherein said classifier is a decision tree classifier.

18. The computerized apparatus of claim 15, further comprising a classification review module operative to enable a user to review the classification determined by said classifier.

19. The computerized apparatus of claim 15 further comprising an effect determinator operative to determine an effect of performing an instruction by the DUT.

20. The computerized apparatus of claim 19, wherein said effect determinator is operative to simulate performing the instruction with respect to two different values of a resource utilized by the DUT, wherein based on a difference of operation of the DUT, an effect of at least a portion of the two different states on the operation of the instruction by the DUT is determined.

21. The computerized apparatus of claim 20, wherein said effect determinator is operative to determine whether an instruction having instruction attributes is operative to cause the DUT to write to a storage unit, and wherein said effect determinator is operative to determine whether the instruction having the instruction attributes is operative to cause the DUT to read from a storage unit.

22. The computerized apparatus of claim 20, wherein the one or more resources is a memory space or a processor unit.

23. A computer program product, the product comprising:
- a non-transitory machine readable storage medium;
- a first program instruction for performing repeatedly: operating an instruction generator associated with a Design Under Test (DUT), whereby a generated instruction is determined, the generated instruction having one or more instruction attributes; and collecting information relating to the generated instruction;
- a second program instruction for utilizing a classification technique to classify the information based on the instruction attributes;
- a third program instruction for determining design knowledge associated with the DUT based on the classified information; and
- a fourth program instruction for performing functional verification using the instruction generator utilizing the design knowledge associated with the DUT, wherein the instruction generator is operative to utilize the design knowledge in generating tests wherein the classification is based on the generated instruction and the collected information; and wherein said first, second, third and fourth program instructions are stored on said non-transitory machine readable storage medium.

\* \* \* \* \*